United States Patent
Kim

(10) Patent No.: US 6,897,249 B2
(45) Date of Patent: May 24, 2005

(54) ASPHALT ADDITIVE, A COMPOSITION ADDED WITH THE ASPHALT ADDITIVE, AND A METHOD FOR PREPARATION OF THE COMPOSITION AND ITS APPLICATION

(76) Inventor: Hion-Joon Kim, 30-2 Jak Dong, Ohjung-Gu, Bucheon City, Kyunggi-Do (KR)

(*) Notice: Subject to any disclaimer, the term of this patent is extended or adjusted under 35 U.S.C. 154(b) by 538 days.

(21) Appl. No.: 09/962,524

(22) Filed: Sep. 25, 2001

(65) Prior Publication Data

US 2003/0065063 A1 Apr. 3, 2003

(51) Int. Cl.[7] .............................................. C08L 95/00
(52) U.S. Cl. ........................................ 524/68; 524/71
(58) Field of Search .......................... 524/68, 71, 499; 521/41

(56) References Cited

FOREIGN PATENT DOCUMENTS

JP          63-156859        *    6/1988

* cited by examiner

*Primary Examiner*—Peter Szekely
(74) *Attorney, Agent, or Firm*—Cantor Colburn LLP

(57) ABSTRACT

The present invention provides an asphalt additive comprising a tire rubber powder and a petroleum resin. This asphalt additive is used in preparation of a reformed asphalt and paving material, which is effective in reduction of noise from traffic, minimization of crevice from contraction of road in winter and plastic deformation of road in summer, prevention of traffic accidents due to slippery road when raining, and prevention of water curtain and splash. Further, the road structure employing the present invention is helpful for protection of water resource. Moreover, the present invention provides an asphalt composition (echophalt) using the asphalt additive, and a method for preparation of the asphalt composition and its application.

5 Claims, No Drawings

ASPHALT ADDITIVE, A COMPOSITION ADDED WITH THE ASPHALT ADDITIVE, AND A METHOD FOR PREPARATION OF THE COMPOSITION AND ITS APPLICATION

BACKGROUND OF THE INVENTION

1. Field of the Invention

The present invention relates to a preparation of asphalt and its application as a paving material, more specifically, to an asphalt additive and its application.

2. Description of the Related Art

Recent tendency for road focusing on the convenience, high-quality, durability, and environmental friendliness rather than its former emphasis on mere transport function of materials and personnel has been increased, leading to higher demand for replacement of the conventional road.

The conventional asphalt mixture widely used for road pavement is a mixture for hot mixing and hot application of asphalt as specified in KSF 2349. This mixture is produced by a mechanical forced mixing facility (asphalt mixing plant) through mixture of smashed rocks, sand, and mineral powder at 150~170° C. according to mixing requirement, which is delivered to the construction site by means of various transportation vehicles, such as dump truck. The mixture is paved in situ at above 125° C. by the finisher, roller, or other suitable means, which is then finished according to the specified level of construction requirements depending on vehicle loads.

AP-3 (complying with asphalt specification) is mainly used in Korea as a binding agent, which should meet the following specification in accordance with KSM 2201 (Specification of Asphalt for Pavement).

| Items | Conditions | Limits |
|---|---|---|
| Penetration degree | 25° C., 100 g, 5 sec | 85~100 |
| Ignition temperature | COC, ° C. | NLT 230 |
| Ductility | (25° C., 5 cm/min) cm | NLT 100 |
| Penetration degree after heating of thin film (Against the basic penetration degree) | % | NLT 47 |
| Ductility after heating of thin film | (25° C., 5 cm/min) cm | NLT 75 |
| Soluble trichloroethane | % | NLT 99 |

* NLT: Not less than

However, one of major problems observed in the conventional asphalt mixture is that paving cannot be conducted when the temperature is below zero. Indeed, the guidelines on road pavement provided by the Ministry of Construction and Transportation require that pavement should not be done below 5° C. Further, in summer, various problems, such as the rutting of road surface, irregular corrugation along the longitudinal section, labelling arising from plastic deformation, bleeding of asphalt fluid due to increase of road load, repetitively occur, leading to decrease of durability owing to the resultant crevices, holes, and ablation. So, re-pavement or repair of road is repetitively required every four to five years, which greatly contributes to increase of budget for maintenance of road, compared to that for new construction of roads.

Moreover, in the conventional road, a sound-absorbing wall has been used to block the noise from traffic. If it does not work for sufficient reduction of noise, another window for prevention of noise is additionally installed. Such installation of the sound-absorbing wall or window is very expensive. When they are not effective in blocking of noise, there has been no choice but control the traffic speed.

SUMMARY OF THE INVENTION

The purpose of this invention is to provide an asphalt additive used for mixing of asphalt and paving materials, which is expected to reduce the noise from traffic, prevent any plastic deformation of road in summer, and minimize crack from contraction in winter.

Another purpose of this invention is to provide an asphalt composition containing the asphalt additive.

The third purpose of this invention is to provide a method for preparation of the asphalt composition and its application.

DESCRIPTION OF THE PREFERRED EMBODIMENT

An asphalt additive of this invention comprises a tire rubber powder and a petroleum resin, wherein the tire rubber powder has a particle size of about 30~40 mesh and the petroleum resin is a thermoplastic resin with a softening point of 95~160° C. and specific gravity of 1.05~1.1.

An asphalt composition of this invention comprises 2.5~7.5 wt. % of an asphalt additive and can be prepared by mixing 5~10 wt. % of a straight asphalt, 2~7 wt. % of the tire rubber powder, 3~8 wt. % of the petroleum resin, and a balance of an aggregate for asphalt pavement.

The straight asphalt has a penetration degree of 43~72 mm, a softening point of above 47° C., and ductility of above 50 cm.

The above aggregate can be a composition of particles with different particle sizes. When maximum particle size of the aggregate is 13 mm, the particle distribution based on passage of mesh can be as follows; 92~100% of 13 mm, 62~81% of 9.5 mm, 10~31% of 4.75 mm, 10~21% of 2.36 mm, 4~17% of 0.6 mm, 3~12% of 0.3 mm, 3~8% of 0.15 mm, and 2~7% of 0.75 mm. When maximum particle size of the aggregate is 19 mm, the particle distribution based on passage of mesh can be as follows; 95~100% of 19 mm, 53~78% of 13 mm, 35~62% of 9.5 mm, 10~31% of 4.75 mm, 10~21% of 2.36 mm, 4~17% of 0.6 mm, 3~12% of 0.3 mm, 3~8% of 0.15 mm, and 2~7% of 0.75 mm.

The aggregate is mainly the hard one with particle size of 19 mm~2.36 mm and makes up for 80 to 90% of total weight. Further, since big aggregates meet the quality requirement as specified in KSF 2357 (Specification of Asphalt for Pavement), the porosity required for paved road can be realized.

Detailed particle distribution is summarized in Table 1.

TABLE 1

Particle Distribution of Asphalt composition of this Invention

| Particle Diameter (mm) | Passage Rate (%) Max. Diameter 13 mm (%) | Passage Rate (%) Max. Diameter 19 mm (%) |
|---|---|---|
| 19 | 100 | 95~100 |
| 13.2 | 92~100 | 53~78 |
| 9.5 | 62~81 | 35~62 |
| 4.75 | 10~31 | 10~31 |

TABLE 1-continued

Particle Distribution of Asphalt composition of this Invention

| Particle Diameter (mm) | Passage Rate (%) Max. Diameter 13 mm (%) | Max. Diameter 19 mm (%) |
|---|---|---|
| 2.36 | 10~21 | 10~21 |
| 0.6 | 4~17 | 4~17 |
| 0.3 | 3~12 | 3~12 |
| 0.15 | 3~8 | 3~8 |
| 0.75 | 2~7 | 2~7 |
| Asphalt Content | 4.5~5.5% | |

In order to use the aggregate with flatness of below ⅓ and higher abrasion coefficient, the hard-steel slug aggregate with surface abrasion rate of below 2.8 and hardness of above 3 is preferentially used, which results in desirable skid-proof effects and stability even under strong shock. Further, the porosity of the composition reaches 15 to 25%.

The asphalt additive and asphalt composition of this invention can reduce the noise from traffic due to its unique properties, such as sound-absorbing, porosity, and particle size of aggregate, which can be further explained as below.

(1) Air Pumping of Tire

When tire comes to contact the road surface, the air gap in the road surface removes the compression and expansion of air present between tire and road, leading to decrease of noise through air pumping and air resonance.

(2) Sound Absorption

The air gap in the road plays an important role of absorbing sound generated by a space between grooves of tire and road surface, leading to reduction of reflection and spread of noise (acoustic absorber). This property can contribute to absorption of other surrounding noise, in addition to the noise from tire and road.

In order to improve the durability, stability, and binding strength of the asphalt composition, the binding agent of this invention is prepared by mixing a straight asphalt, a rubber powder from wasted tire, and a petroleum resin rather than using the conventional AS-P asphalt. Use of wasted tire has various effects, including low cost and easy procurement. Appropriate mixing of the rubber powder from waster tire and petroleum resin results in desirable binding agent satisfying the relevant requirements, which is the very reformed asphalt.

This asphalt binding agent is a mixture with appropriate porosity satisfying the Marshall's stability level of more than 500 kg at the following conditions.

| | |
|---|---|
| Penetration degree | 43~72 |
| Softening point | NLT 70 |
| Ductility | NLT 50 |
| Toughness (kgf.cm) | NLT 100 |
| Tenacity (kgf.cm) | NLT 100 |
| Viscosity at 140° C. (poise) | NLT 800 |

This binding agent and aggregate with specified particle size have the properties of being better coated at higher temperature by 15~25° C. than the temperature for mixing of the conventional asphalt concrete and being easily bound due to melting of thermoplastic petroleum resin preventing movement through reinforcement of binding strength. Its specific gravity is 1.05~1.1 (ASTM D 71~72a) and the softening point is 95~160° C. (ASTM E28~58).

Also, the asphalt composition added with 2~7 wt. % of the rubber powder made by reducing the wasted tire through cold-freezing treatment to powder of below 30~40 mesh showed desirable effect of preventing cracks arising from contraction at the temperature of below zero.

Further, since the tire rubber is originally made to contain the UV blocking agent, anti-flowing agent, carbon, etc. and UV-induced-oxidation resistance material and aging resistance material are included to prevent decrease of binding strength and endure the contraction in winter, main problems observed in the conventional asphalt pavement, such as labelling arising from plastic deformation in summer, breeding owing to heavy load, and crack of road, can be avoided. Moreover, contraction of paving material itself can contribute to prevention of decrease of road life span resulting from crevice, crack, or holes.

The asphalt composition of this invention is prepared by mixing 5~10 wt. % of straight asphalt, 2~7 wt. % of rubber powder, 3~8 wt. % of petroleum resin, and aggregate for asphalt pavement at 175~195° C. At first, the asphalt, rubber powder from wasted tire, and petroleum resin are mixed to make the reformed asphalt and then, aggregate is added at high temperature. Or, it can be directly prepared through hot mixing of the straight asphalt, asphalt additive, and aggregate.

Also, this invention provides the application of this asphalt composition to low-noise asphalt pavement by applying the previously prepared low-noise asphalt composition over road while maintaining the temperature of above 150° C.

The technology of applying the asphalt composition of this invention, considered as the highest-quality pavement technology, is an improved one from the conventional one for paving of asphalt concrete. The application of the asphalt composition of this invention to the asphalt pavement comprises the following processes.

1. 5~10 wt. % of straight asphalt, 2~7 wt. % of tire rubber powder, 3~8 wt. % of petroleum resin, and aggregate for asphalt pavement are mixed at 175~195° C. using an asphalt mixing plant.

2. The asphalt composition prepared in the above process is delivered to the construction site by a 15-ton truck at the speed of 40 km/h (because of porous structure) To maintain the temperature during delivery, appropriate insulation measure, such as covering, has to be taken.

3. The delivered asphalt composition is paved over water-repellent material at above 150° C. (preferentially, above 165° C.). The asphalt composition is paved to accomplish the appropriate thickness, preferentially 5 cm, over 1.5 cm of the underlying layer preventing penetration of water (water-repellent material). The water-repellent material is a composition prepared by mixing 80~84% of asphalt material with penetration degree of 35~50 and 16~20% of polypropylene polymer, thermoplastic resin, portland resin, and asphaltene at above 180° C. The relevant technologies were already disclosed in Korea (Patent application no. 98-1205 and 98-5192) and they are fully referenced in this description.

4. With use of a vibrating tire roller, the paved road is continuously hardened three times. If too heavy roller is used at the first hardening, appropriate hardening cannot be achieved and materials can be pushed toward a specific direction, compromising the flatness. So, the first hardening work should be carefully conducted at above 165° C. within short time limit and without vibration. The second hardening should be done at above 110° C. with use of a vibrating roller and the third hardening should be rapidly conducted at above 60° C. with use of a non-vibrating rubber tire.

Since the asphalt composition of this invention has the porous property, the pavement with use of it is a water penetration asphalt pavement or a penetration pavement.

In the conventional water penetration asphalt pavement, rainwater is penetrated into the porous asphalt layer, aggregate layer, sand layer, and then soil. Such pavement is mainly used for square, bicycle road, or footway. In this case, AS-P, the existing asphalt material, with properties of 85~100 of penetration degree, 230° C. of ignition temperature, 45° C. of softening point, above 100 of ductility at 25° C., is used as a binding agent.

Although the outer layer of road paved with the asphalt composition of this invention has the porous structure like the conventional water penetration asphalt pavement, its particle composition is completely different. Also, the binding agent used has higher ignition temperature and better elasticity at cold temperature than the conventional AS-P. It has the structure of allowing rainwater to penetrate into the outer layer, to be collected around the lower water-repellent layer, and then to be drained through downward gradient or drainage system. In this system, the asphalt concrete for the water-repellent layer was already disclosed through the present inventor's patent application no. 98-1205 and 98-5192. Accordingly, the road paved with the asphalt composition of this invention can prevent skid, water curtain, and splash phenomena frequently observed when raining. Further, this invention can contribute to protection of water resource.

The asphalt composition of this invention can be applied to pavement of airport, factory, highway, and other roads. It can efficiently increase the break friction, reduce the traffic noise, and lengthen the life span of pavement to more than 10 years.

The present invention is further illustrated by the following examples which should not be taken to limit the scope of this invention.

EXAMPLE 1

Wheel Tracking Test

The road paved with the asphalt composition of this invention has the underlying water-repellent layer. Prior to road driving test, the wheel tracking test was conducted to check the dynamic change rate and abrasion resistance of the upper surface structure by a road institute under the Korea Highway Corporation.

The test results can be summarized as follow:

|  |  | Conventional Asphalt concrete | Low-noise pavement |
|---|---|---|---|
| Stiffness | Dynamic change rate | 11.8~16 | 0.014~0.0064 |
|  | Marshall's strength | 500 | 1513~1869 |
| Abrasion | Wheel tracking index | 600~800 | 2870~6650 |
| Softening Point |  | 40~50 | 75~80 |
| Strain |  | 1 | 25~100 |

According to the above results, problems found in the porous composition structure were corrected and then, another test was conducted. In this second test, more satisfactory results were obtained by 25 times, when compared to the conventional mixture.

EXAMPLE 2

Absorption of Noise at Driving Test

Traffic noise is expressed as db, which is determined by various factors, including daily traffic amount (traffic amount/day), velocity, traffic types, road inclination, pavement condition, and type of pavement material. In general, the noise level from traffic is in the range of 74~84 db.

During driving test, the noise level was measured at 1 m away from road using an emission noise measuring equipment at the low-noise paved road and the conventional road by allowing vehicles to drive at 60 km/hour.

This measurement was conducted at a quiet mountain road in northern Gyeonggi province. The temperature was 27° C. and the humidity was about 70%. A driver ran a compact car at constant velocity.

The noise level was 70~75 db in the case of the conventionally paved road, while it was 60~62 db in the case of the road paved with the asphalt composition of this invention, showing the decrease of noise level by about 10 to 15%. When this is expressed as change of frequency, about 40% of acoustic absorption effect is resulted.

This result indicates that the road paved with the asphalt composition of this invention can reduce the noise level by more than 2 times, when compare to the reduction result of only 3 to 5 db shown by the sound-absorbing wall installed in residence area, school, or hospital near the road. Further, such sound-absorbing wall can convert the traffic noise into another reverberated noise amplified, but the low-noise pavement was found to cause disappearance of the noise.

Moreover, to install such sound-absorbing wall with length of 3.5 m and width of 1 m, the cost is about 800,000 won in Korean currency as of 1998, so installation of such wall at both sides of a road for 100 m will require 16,000,000 won. However, the low-noise pavement of this invention costs only 30,000 won per 1 $m^2$, meaning economical efficiency.

As described above, this invention will have effects of providing the best service to road users, reducing traffic noise, preventing traffic accident arising from skid, water curtain, and splash phenomena, protecting water resource through effective drain function, and accomplishing excellent sound-absorbing and economical efficiency.

What is claimed is:

1. A low-noise asphalt composition comprising:
   5~10 wt. %, based on the total weight of the composition, of a straight asphalt;
   an asphalt additive including:
      2~7 wt. %, based on the total weight of the composition, of a tire rubber powder, and
      3~8 wt. %, based on the total weight of the composition, of a petroleum resin; and
   a balance of an aggregate suitable for asphalt paving material,
   wherein the straight asphalt has a penetration degree of 43~72 mm, a softening point of more than 47° C., and ductility of above 50 cm.

2. The low-noise asphalt composition according to claim 1, wherein the aggregate has maximum 13 mm of particle size and, based on passage through a mesh, its particle distribution is 92~100% of 13 mm, 62~81% of 9.5 mm, 10~31% of 4.75 mm, 10~21% of 2.36 mm, 4~17% of 0.6 mm, 3~12% of 0.3 mm, 3~8% of 0.15 mm, and 2~7% of 0.75 mm.

3. The low-noise asphalt composition according to claim 1, wherein the aggregate has maximum 19 mm of particle size and, based on passage through a mesh, its particle distribution is 95~100% of 19 mm, 53~78% of 13 mm, 35~62% of 9.5 mm, 10~31% of 4.75 mm, 10~21% of 2.36 mm, 4~17% of 0.6 mm, 3~12% of 0.3 mm, 3~8% of 0.15 mm, and 2~7% of 0.75 mm.

4. The low-noise asphalt composition according to claim 2, wherein a particle of the aggregate having an average particle diameter of about 4.75 mm comprises 5~10 wt. % of a hard steel slug with surface abrasion of below 2.8 and hardness of above 3.

5. The low-noise asphalt composition according to claim 3, wherein a particle of the aggregate having an average particle diameter of about 4.75 mm comprises 5~10 wt. % of a hard steel slug with surface abrasion of below 2.8 and hardness of above 3.

* * * * *